T. H. LACKMAN.
PACKING RING.
APPLICATION FILED SEPT. 15, 1921.
1,413,409.
Patented Apr. 18, 1922.
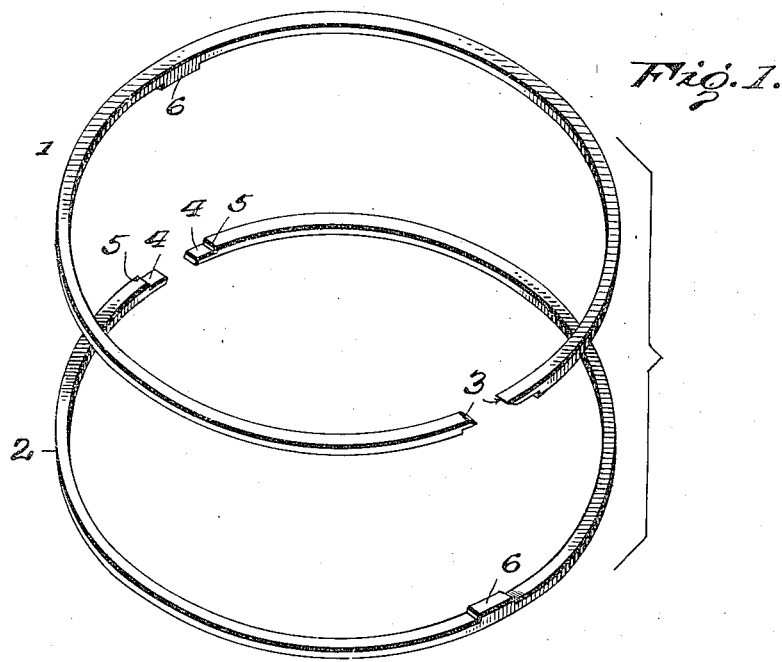
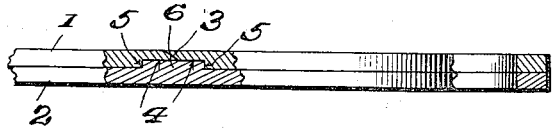
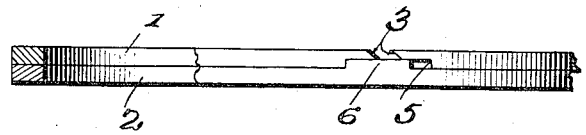
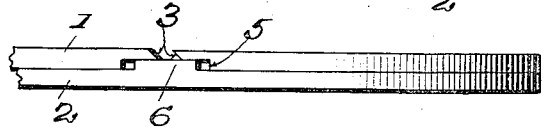
WITNESSES
W. A. Williams.
INVENTOR
Theodore H. Lackman
BY
ATTORNEYS

UNITED STATES PATENT OFFICE.

THEODORE H. LACKMAN, OF AUGUSTA, GEORGIA.

PACKING RING.

1,413,409.

Specification of Letters Patent. Patented Apr. 18, 1922.

Application filed September 15, 1921. Serial No. 500,763.

*To all whom it may concern:*

Be it known that I, THEODORE H. LACKMAN, of Augusta, in the county of Richmond and State of Georgia, have invented certain new and useful Improvements in Packing Rings; and I do hereby declare the following to be a full, clear, and exact description of the invention, such as will enable others skilled in the art to which it appertains to make and use the same.

My object is to provide a simple and efficient packing adapted for gas engine pistons.

Fig. 1 is a perspective view of two of the rings, and

Fig. 2 shows two rings assembled and under full compression.

Figs. 3 and 4 are, respectively, fragmentary views of one of the joints when the rings are under partial compression and when in improper relation.

The rings are assembled in superposed order and not in concentric arrangement. Both forms are known in the art but the main features of my invention reside in structures of the former kind.

Each of the rings, 1 and 2 is a split ring transversely cut to form beveled edges 3 normally spaced apart. On its inner face, that is the face which is adapted to contact with an adjacent packing element, the ring is rabbeted to form bearing surfaces 4 and end shoulders 5.

At a point diametrically opposite its cleft the ring is formed on its inner face with a boss 6. This boss is of length greater than the normal space between the edges 3 of the adjacent ring so that it may always span this space. This is true when the rings are only slightly compressed as in Fig. 3 as well as when fully compressed as in Fig. 2. But whatever the degree of compression there is only one opening and that is between the ends 3. Even if the two rings be improperly assembled, as in Fig. 4, this fact remains.

It will be noted that the boss does not constitute a stop for the ends 3; it simply covers the opening. When fully compressed the ends 3 abut each other and the boss fits snugly within the recesses formed by the rabbeted portions and between the shoulders 5, forming a perfectly closed joint. In consequence I make provision for expansion due to wear of the rings and cylinder and still maintain a close union with the walls of the cylinder. When a boss formed substantially similar to mine extends into the space between ends such as 3 and forms stops for such ends, as frequently occurs in the prior art, it is manifest that the results mentioned cannot be attained. The only perfect closure that can result from such a construction is when tight contact exists and this is destroyed by slight wear. Furthermore, there are necessarily two openings at a joint of that character.

Likewise where the boss is tapered or beveled my results cannot be attained because the expansion of the ring causes its ends to slide along the boss and be pressed away from the sides of the cylinder. My boss presents a flat surface parallel with the faces of the rings and with the bearing surfaces 4.

I claim as my invention:

A packing ring comprising a pair of annular members each having a boss formed on its inner face whose inner surface is flat and parallel with the faces of the ring, and a diametrically opposite cleft with rabbeted portions at both sides thereof, said rabbeted portions forming bearing surfaces for the inner face of the boss and extending parallel with the faces of the ring and having end shoulders adapted to contact with said boss under full compression, said boss spanning the space between the ends of the adjacent ring.

THEODORE H. LACKMAN.